(12) United States Patent
Adams et al.

(10) Patent No.: US 8,586,893 B2
(45) Date of Patent: *Nov. 19, 2013

(54) RAPID DETECTION OF IMMINENT FAILURE IN OPTICAL THERMAL PROCESSING OF A SUBSTRATE

(75) Inventors: Bruce E. Adams, Portland, OR (US); Dean Jennings, Beverly, MA (US); Aaron Muir Hunter, Santa Cruz, CA (US); Abhilash J. Mayur, Salinas, CA (US); Vijay Parihar, Fremont, CA (US)

(73) Assignee: Applied Materials, Inc., Santa Clara, CA (US)

( * ) Notice: Subject to any disclaimer, the term of this patent is extended or adjusted under 35 U.S.C. 154(b) by 549 days.

This patent is subject to a terminal disclaimer.

(21) Appl. No.: 12/075,798

(22) Filed: Mar. 12, 2008

(65) Prior Publication Data

US 2008/0217306 A1    Sep. 11, 2008

Related U.S. Application Data

(63) Continuation of application No. 11/185,454, filed on Jul. 20, 2005, now Pat. No. 7,422,988.

(60) Provisional application No. 60/627,529, filed on Nov. 12, 2004.

(51) Int. Cl.
 *B23K 26/04*    (2006.01)
 *B23K 26/03*    (2006.01)
 *B23K 26/42*    (2006.01)

(52) U.S. Cl.
 CPC .............. *B23K 26/032* (2013.01); *B23K 26/03* (2013.01); *B23K 26/422* (2013.01)
 USPC .................................. 219/121.62; 219/121.83

(58) Field of Classification Search
 USPC ............. 219/121.79, 121.81, 121.61, 121.62, 219/121.65, 121.66; 347/256, 224, 241; 372/22, 21, 24, 26, 27
 See application file for complete search history.

(56) References Cited

U.S. PATENT DOCUMENTS 3,778,791 A    12/1973    Lewicki et al. ............. 179/100.2
4,015,100 A    3/1977    Gnanamuthu et al.
(Continued)

FOREIGN PATENT DOCUMENTS

DE    10339237 A1    3/2004
EP    0231794 A2    8/1987
(Continued)

OTHER PUBLICATIONS

Official Action Dated Dec. 31, 2009 Issued in Co-Pending U.S. Appl. No. 12/283,615.

(Continued)

*Primary Examiner* — Henry Yuen
*Assistant Examiner* — Thien S Tran
(74) *Attorney, Agent, or Firm* — Robert M. Wallace

(57) ABSTRACT

A system for thermal processing of a substrate includes a source of radiation, optics disposed between the source and the substrate to receive light from the source of radiation at the optics proximate end, and a housing holding the optics and having a void inside the housing isolated from light emitted from the source. A light detector is disposed within the void in the housing to detect light from the optics emitted into the housing and send a deterioration signal. The system further includes a power supply for the source of radiation, and a controller to control the power supply based on the deterioration signal from the light detector.

17 Claims, 3 Drawing Sheets

(56) References Cited

U.S. PATENT DOCUMENTS

| | | | |
|---|---|---|---|
| 4,079,230 A | 3/1978 | Miyauchi et al. | |
| 4,099,875 A | 7/1978 | McMahon et al. | 356/342 |
| 4,305,640 A | 12/1981 | Cullis et al. | 350/96.1 |
| 4,316,074 A | 2/1982 | Daly | |
| 4,448,547 A | 5/1984 | Wickersheim | |
| 4,647,774 A | 3/1987 | Nrisk et al. | 250/338 |
| 4,694,136 A * | 9/1987 | Kasner et al. | 219/121.64 |
| 4,730,113 A | 3/1988 | Edwards | 250/347 |
| 4,818,886 A * | 4/1989 | Drucker | 250/566 |
| 5,238,858 A | 8/1993 | Matsushita | |
| 5,463,202 A | 10/1995 | Kurosawa et al. | 219/121.83 |
| 5,861,992 A | 1/1999 | Gelbart | 359/619 |
| 5,886,313 A | 3/1999 | Krause et al. | |
| 6,040,787 A * | 3/2000 | Durham | 340/932.2 |
| 6,080,236 A * | 6/2000 | McCulloch et al. | 117/4 |
| 6,240,116 B1 | 5/2001 | Lang et al. | 372/50 |
| 6,494,371 B1 | 12/2002 | Rekow et al. | 235/454 |
| 6,530,687 B1 | 3/2003 | Suzuki et al. | 374/131 |
| 6,531,681 B1 | 3/2003 | Markle et al. | 219/121.69 |
| 6,747,245 B2 * | 6/2004 | Talwar et al. | 219/121.8 |
| 6,771,686 B1 | 8/2004 | Ullman et al. | 372/92 |
| 6,780,692 B2 | 8/2004 | Tatsuiki et al. | 438/166 |
| 6,809,012 B2 | 10/2004 | Yamazaki et al. | 438/473 |
| 6,847,457 B2 | 1/2005 | Tobiason et al. | 356/495 |
| 6,895,164 B2 | 5/2005 | Saccomanno | 385/146 |
| 6,987,240 B2 | 1/2006 | Jennings et al. | 219/121.8 |
| 7,005,601 B2 | 2/2006 | Jennings | 219/121.66 |
| 7,129,440 B2 | 10/2006 | Adams et al. | 219/121.65 |
| 7,135,392 B1 | 11/2006 | Adams et al. | 438/166 |
| 7,494,272 B2 | 2/2009 | Thomas et al. | 374/53 |
| 2003/0196996 A1 | 10/2003 | Jennings et al. | |
| 2003/0234970 A1 * | 12/2003 | Phillips et al. | 359/291 |
| 2004/0095983 A1 | 5/2004 | Whitley | 372/108 |
| 2004/0136662 A1 * | 7/2004 | Takagi et al. | 385/92 |
| 2004/0149217 A1 | 8/2004 | Collins et al. | 118/723 |
| 2004/0179807 A1 | 9/2004 | Tanaka | 385/146 |
| 2004/0188399 A1 | 9/2004 | Smart | 219/121.69 |
| 2004/0198028 A1 | 10/2004 | Tanaka et al. | 438/487 |
| 2004/0263986 A1 | 12/2004 | Brown | 359/626 |
| 2005/0063451 A1 | 3/2005 | Abe et al. | |
| 2005/0175285 A1 | 8/2005 | Reynolds et al. | 385/39 |
| 2006/0008237 A1 | 1/2006 | Imade | 385/146 |
| 2006/0102607 A1 | 5/2006 | Adams et al. | 374/126 |
| 2006/0105585 A1 | 5/2006 | Jennings et al. | 438/473 |
| 2006/0114572 A1 * | 6/2006 | Bittner | 359/641 |
| 2008/0025368 A1 | 1/2008 | Aderhold et al. | 374/102 |
| 2008/0210671 A1 | 9/2008 | Jennings et al. | 219/121.61 |
| 2009/0200279 A1 | 8/2009 | Li | 219/121.66 |
| 2009/0296774 A1 | 12/2009 | Koelmel et al. | 374/121 |

FOREIGN PATENT DOCUMENTS

| | | | |
|---|---|---|---|
| EP | 0458388 A1 | 11/1991 | |
| JP | 57099747 A | 6/1982 | |
| JP | 57-167692 | * 10/1982 | H01S 3/00 |
| JP | 07-134069 | 5/1995 | |
| JP | 02000091231 A | 3/2000 | |
| JP | 2003-245789 | 9/2003 | |
| WO | WO 03/089184 A1 | 10/2003 | |
| WO | WO 2004/044955 A2 | 5/2004 | |

OTHER PUBLICATIONS

Official Action Dated Jul. 20, 2009 in Co-Pending U.S. Appl. No. 11/198,660.

Official Action Dated Jun. 19, 2012 Issued in Co-Pending U.S. Appl. No. 12/465,906.

Official Action Dated Apr. 26, 2011 Issued in Co-Pending U.S. Appl. No. 12/465,906.

* cited by examiner

RAPID DETECTION OF IMMINENT FAILURE IN OPTICAL THERMAL PROCESSING OF A SUBSTRATE

CROSS REFERENCE TO RELATED APPLICATIONS

This application is a continuation of U.S. patent application Ser. No. 11/185,454 filed Jul. 20, 2005 entitled RAPID DETECTION OF IMMINENT FAILURE IN LASER THERMAL PROCESSING OF A SUBSTRATE by Bruce Adams, et al., which claims the benefit of U.S. Provisional Application No. 60/627,529 filed Nov. 12, 2004, both of which are assigned to the present assignee.

This application contains subject matter related to U.S. Pat. No. 7,129,440 issued Oct. 31, 2006 entitled SINGLE AXIS LIGHT PIPE FOR HOMOGENIZING SLOW AXIS OF ILLUMINATION BASED ON LASER DIODES by Bruce Adams, et al.; U.S. Pat. No. 7,135,392 issued Nov. 13, 2006 entitled THERMAL FLUX LASER ANNEALING FOR ION IMPLANTATION OF SEMICONDUCTOR P-N JUNCTIONS by Bruce Adams, et al.; U.S. application Ser. No. 11/195,380 filed Aug. 2, 2005 (U.S. Patent Application Publication No. 2006/0102607 published May 18, 2006) entitled MULTIPLE BAND PASS FILTERING FOR PYROMETRY IN LASER BASED ANNEALING SYSTEMS by Bruce Adams et al.; and U.S. patent application Ser. No. 11/198,660 filed Aug. 5, 2005 (U.S. Patent Application Publication No. 2006/0105585 published May 18, 2006) entitled AUTOFOCUS FOR HIGH POWER LASER DIODE BASED ANNEALING SYSTEM by Dean Jennings, et al., all of which applications are assigned to the present assignee.

FIELD

The invention relates generally to thermal processing of semiconductor substrates. In particular, the invention relates to laser thermal processing of semiconductor substrates.

BACKGROUND

Thermal processing is required in the fabrication of silicon and other semiconductor integrated circuits formed in silicon wafers or other substrates such as glass panels for displays. The required temperatures may range from relatively low temperatures of less than 250° C. to greater than 1000°, 1200°, or even 1400° C. and may be used for a variety of processes such as dopant implant annealing, crystallization, oxidation, nitridation, silicidation, and chemical vapor deposition as well as others.

For the very shallow circuit features required for advanced integrated circuits, it is greatly desired to reduce the total thermal budget in achieving the required thermal processing. The thermal budget may be considered as the total time at high temperatures necessary to achieve the desired processing temperature. The time that the wafer needs to stay at the highest temperature can be very short.

Rapid thermal processing (RTP) uses radiant lamps which can be very quickly turned on and off to heat only the wafer and not the rest of the chamber. Pulsed laser annealing using very short (about 20 ns) laser pulses is effective at heating only the surface layer and not the underlying wafer, thus allowing very short ramp up and ramp down rates.

A more recently developed approach in various forms, sometimes called thermal flux laser annealing or dynamic surface annealing (DSA), is described by Jennings et al. in PCT/2003/00196966 based upon U.S. Pat. No. 6,987,240, issued Jan. 17, 2006 and incorporated herein by reference in its entirety. Markle describes a different form in U.S. Pat. No. 6,531,681 and Talwar yet a further version in U.S. Pat. No. 6,747,245.

The Jennings and Markle versions use CW diode lasers to produce very intense beams of light that strike the wafer as a thin long line of radiation. The line is then scanned over the surface of the wafer in a direction perpendicular to the long dimension of the line beam.

SUMMARY

A system for thermal processing of a substrate includes a source of radiation, optics disposed between the source and the substrate to receive light from the source of radiation at the optics proximate end, and a housing holding the optics and having a void inside the housing isolated from light emitted from the source. A sealant is between the optics proximate end and the source of radiation. A light detector is disposed within said void in the housing to detect light from the optics emitted into the housing and send a deterioration signal. The system further includes a power supply for the source of radiation, and a controller to control the power supply based on the deterioration signal from the light detector.

DETAILED DESCRIPTION

Figure 1:
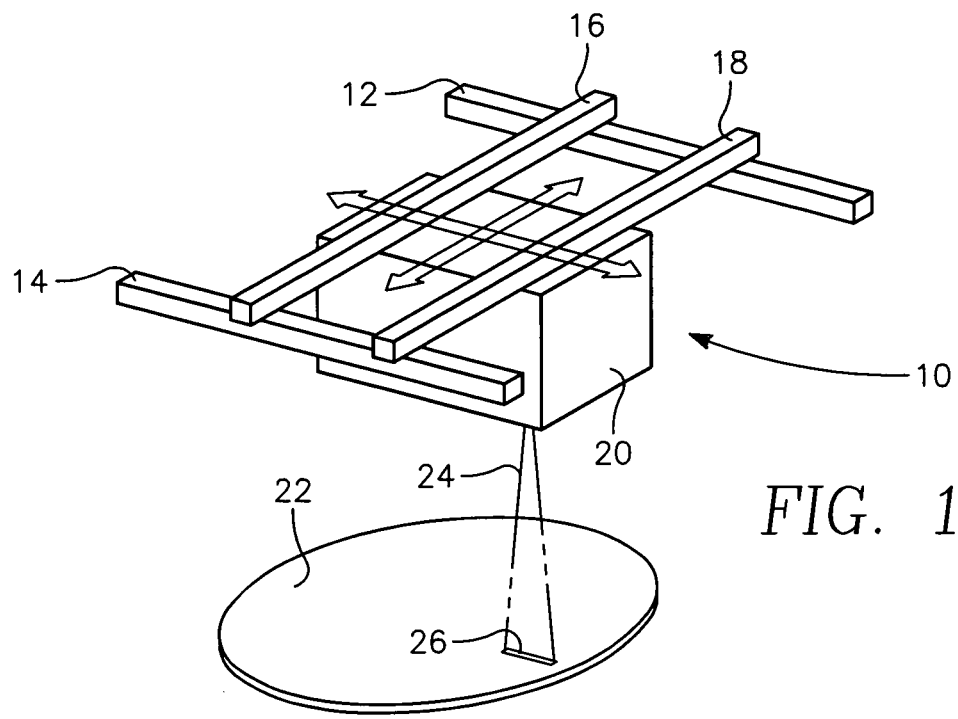
FIG. 1 is an orthographic representation of a thermal flux laser annealing apparatus employed in the present invention.

One embodiment of the apparatus described in the above-referenced application by Jennings et al. is illustrated in the schematic orthographic representation of FIG. 1. A gantry structure 10 for two-dimensional scanning includes a pair of fixed parallel rails 12, 14. Two parallel gantry beams 16, 18 are fixed together a set distance apart and supported on the fixed rails 12, 14 and are controlled by an unillustrated motor and drive mechanism to slide on rollers or ball bearings together along the fixed rails 12, 14. A beam source 20 is slidably supported on the gantry beams 16, 18, and may be suspended below the beams 16, 18 which are controlled by unillustrated motors and drive mechanisms to slide along them. A silicon wafer 22 or other substrate is stationarily supported below the gantry structure 10. The beam source 20 includes a laser light source and optics to produce a downwardly directed fan-shaped beam 24 that strikes the wafer 22 as a line beam 26 extending generally parallel to the fixed rails 12, 14, in what is conveniently called the slow direction. Although not illustrated here, the gantry structure further includes a Z-axis stage for moving the laser light source and optics in a direction generally parallel to the fan-shaped beam 24 to thereby controllably vary the distance between the beam source 20 and the wafer 22 and thus control the focusing of the line beam 26 on the wafer 22. Exemplary dimensions of the line beam 26 include a length of 1 cm and a width of 66 microns with an exemplary power density of 220 kW/cm².

Alternatively, the beam source and associated optics may be stationary while the wafer is supported on a stage which scans it in two dimensions.

In typical operation, the gantry beams 16, 18 are set at a particular position along the fixed rails 12, 14 and the beam source 20 is moved at a uniform speed along the gantry beams 16, 18 to scan the line beam 26 perpendicularly to its long dimension in a direction conveniently called the fast direction. The line beam 26 is thereby scanned from one side of the wafer 22 to the other to irradiate a 1 cm swath of the wafer 22. The line beam 26 is narrow enough and the scanning speed in the fast direction fast enough that a particular area of the wafer is only momentarily exposed to the optical radiation of the line beam 26 but the intensity at the peak of the line beam is enough to heat the surface region to very high temperatures. However, the deeper portions of the wafer 22 are not significantly heated and further act as a heat sink to quickly cool the surface region. Once the fast scan has been completed, the gantry beams 16, 18 are moved along the fixed rails 12, 14 to a new position such that the line beam 26 is moved along its long dimension extending along the slow axis. The fast scanning is then performed to irradiate a neighboring swath of the wafer 22. The alternating fast and slow scanning are repeated, perhaps in a serpentine path of the beam source 20, until the entire wafer 22 has been thermally processed.

The optics beam source 20 includes an array of lasers. An example is orthographically illustrated in FIGS. 2 and 3, in which laser radiation at about 810 nm is produced in an optical system 30 from two laser bar stacks 32, one of which is illustrated in end plan view in FIG. 4. Each laser bar stack 32 includes 14 parallel bars 34, generally corresponding to a vertical p-n junction in a GaAs semiconductor structure, extending laterally about 1 cm and separated by about 0.9 mm. Typically, water cooling layers are disposed between the bars 34. In each bar 34 are formed 49 emitters 36, each constituting a separate GaAs laser emitting respective beams having different divergence angles in orthogonal directions. The illustrated bars 34 are positioned with their long dimension extending over multiple emitters 36 and aligned along the slow axis and their short dimension corresponding to the less than 1-micron p-n depletion layer aligned along the fast axis. The small source size along the fast axis allows effective collimation along the fast axis. The divergence angle is large along the fast axis and relatively small along the slow axis.

Returning to FIGS. 2 and 3 two arrays of cylindrical lenslets 40 are positioned along the laser bars 34 to collimate the laser light in a narrow beam along the fast axis. They may be bonded with adhesive on the laser stacks 32 and aligned with the bars 34 to extend over the emitting areas 36.

Figure 2:
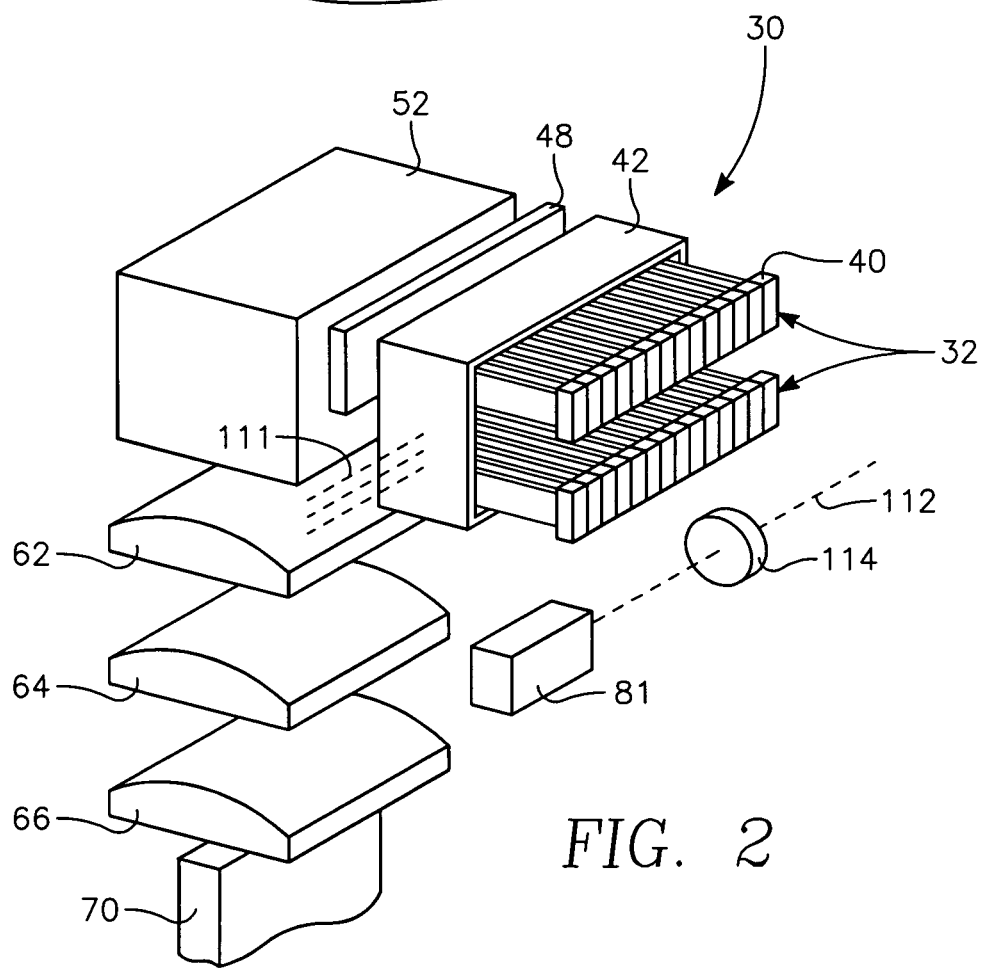
FIGS. 2 and 3 are orthographic views from different perspectives of optical components of the apparatus of FIG. 1.
Figure 3:
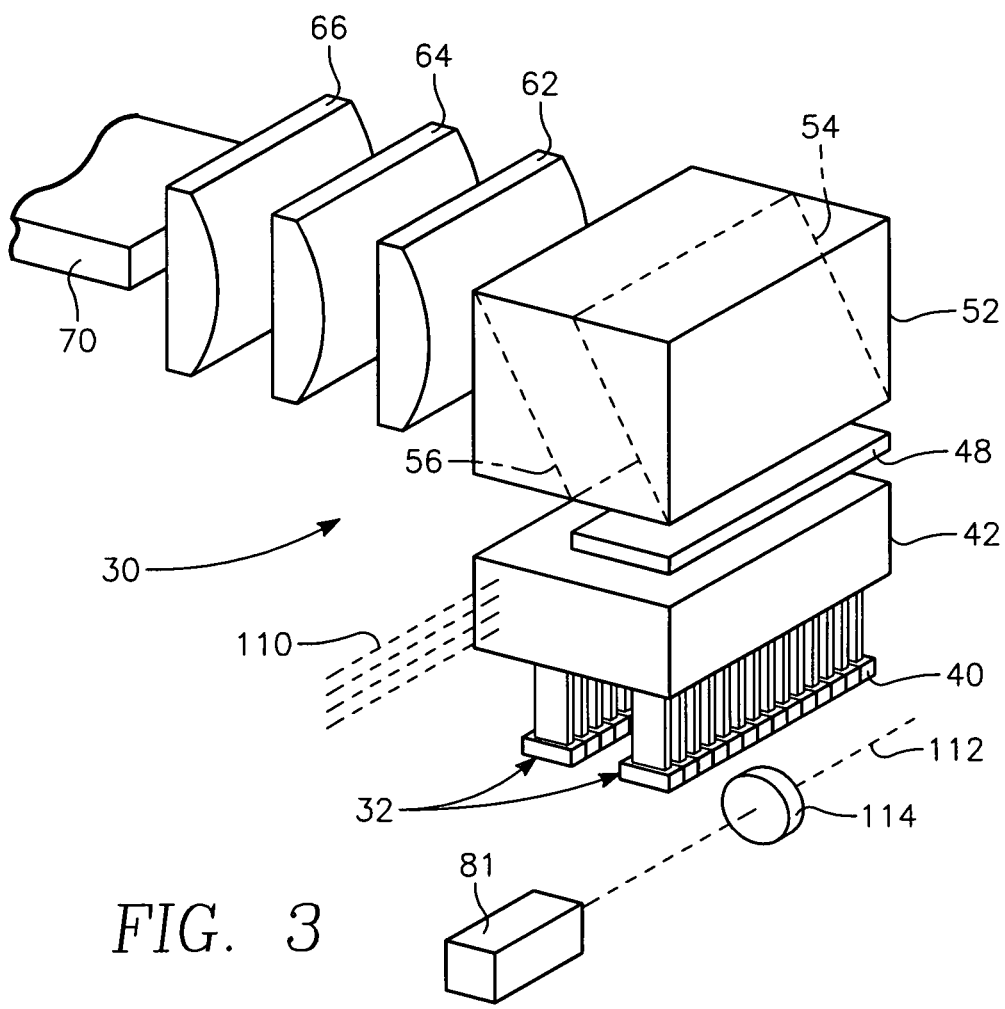

The optics beam source 20 can further include conventional optical elements. Such conventional optical elements can include an interleaver and a polarization multiplexer, although the selection by the skilled worker of such elements is not limited to such an example. In the example of FIGS. 2 and 3, the two sets of beams from the two bar stacks 32 are input to an interleaver 42, which has a multiple beam splitter type of structure and having specified coatings on two internal diagonal faces, e.g., reflective parallel bands, to selectively reflect and transmit light. Such interleavers are commercially available from Research Electro Optics (REO). In the interleaver 42, patterned metallic reflector bands are formed in angled surfaces for each set of beams from the two bar stacks 32 such that beams from bars 34 on one side of the stack 32 are alternatively reflected or transmitted and thereby interleaved with beams from bars 34 on the other side of the stack 32 which undergo corresponding selective transmission/reflection, thereby filling in the otherwise spaced radiation profile from the separated emitters 36.

A first set of interleaved beams is passed through a quarter-wave plate 48 to rotate its polarization relative to that of the second set of interleaved beams. Both sets of interleaved beams are input to a polarization multiplexer (PMUX) 52 having a structure of a double polarization beam splitter. Such a PMUX is commercially available from Research Electro Optics. First and second diagonal interface layers 54, 56 cause the two sets of interleaved beams to be reflected along a common axis from their front faces. The first interface 54 is typically implemented as a dielectric interference filter designed as a hard reflector (HR) while the second interface 56 is implemented as a dielectric interference filter designed as a polarization beam splitter (PBS) at the laser wavelength. As a result, the first set of interleaved beams reflected from the first interface layer 54 strikes the back of the second interface layer 56. Because of the polarization rotation introduced by the quarter-wave plate 48, the first set of interleaved beams passes through the second interface layer 56. The intensity of a source beam 58 output by the PMUX 52 is doubled from that of the either of the two sets of interleaved beams.

Although shown separated in the drawings, the interleaver 42, the quarter-wave plate 48, and the PMUX 52 and its interfaces 54, 56, as well as additional filters that may be attached to input and output faces are typically joined together by a plastic encapsulant, such as a UV curable epoxy, to provide a rigid optical system. An important interface is the plastic bonding of the lenslets 40 to the laser stacks 32, on which they must be aligned to the bars 34. The source beam 58 is passed through a set of cylindrical lenses 62, 64, 66 to focus the source beam 58 along the slow axis.

Figure 5:
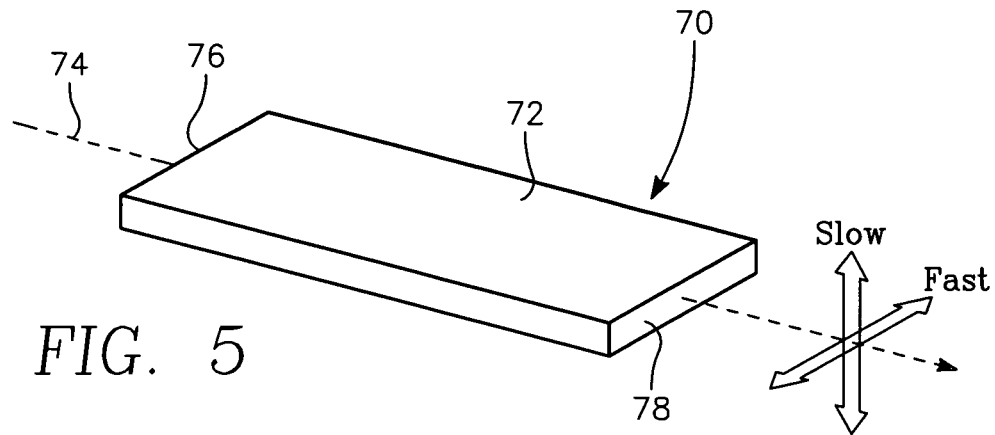
FIG. 5 is an orthographic view of a homogenizing light pipe for the apparatus of FIG. 1.

A one-dimensional light pipe 70 homogenizes the source beam along the slow axis. The source beam, focused by the cylindrical lenses 62, 64, 66, enters the light pipe 70 with a finite convergence angle along the slow axis but substantially collimated along the fast axis. The light pipe 70, more clearly illustrated in the orthographic view of FIG. 5, acts as a beam homogenizer to reduce the beam structure along the slow axis introduced by the multiple emitters 36 in the bar stack 32 spaced apart on the slow axis. The light pipe 70 may be implemented as a rectangular slab 72 of optical glass having a sufficiently high index of refraction to produce total internal reflection. It has a short dimension along the slow axis and a longer dimension along the fast axis. The slab 72 extends a substantial distance along an axis 74 of the source beam 58 converging along the slow axis on an input face 76. The source beam 58 is internally reflected several times from the top and bottom surfaces of the slab 72, thereby removing much of the texturing along the slow axis and homogenizing the beam along the slow axis when it exits on an output face 78. The source beam 58, however, is already well collimated along the fast axis (by the cylindrical lensets 40) and the slab 72 is wide enough that the source beam 58 is not internally reflected on the side surfaces of the slab 72 but maintains its collimation along the fast axis. The light pipe 70 may be tapered along its axial direction to control the entrance and exit apertures and beam convergence and divergence. The one-dimensional light pipe can alternatively be implemented as two parallel reflective surfaces corresponding generally to the upper and lower faces of the slab 72 with the source beam passing between them.

The source beam output by the light pipe 70 is generally uniform. As further illustrated in the schematic view of FIG. 6, further anamorphic lens set or optics 80, 82 expands the output beam in the slow axis and includes a generally spherical lens to project the desired line beam 26 on the wafer 22.

The anamorphic optics 80, 82 shape the source beam in two dimensions to produce a narrow line beam of limited length. In the direction of the fast axis, the output optics have an infinite conjugate for the source at the output of the light pipe (although systems may be designed with a finite source conjugate) and a finite conjugate at the image plane of the wafer 22 while, in the direction of the slow axis, the output optics has a finite conjugate at the source at the output of the light pipe 70 and a finite conjugate at the image plane. Further, in the direction of the slow axis, the nonuniform radiation from the multiple laser diodes of the laser bars is homogenized by the light pipe 70. The ability of the light pipe 70 to homogenize strongly depends on the number of times the light is reflected traversing the light pipe 70. This number is determined by the length of the light pipe 70, the direction of the taper if any, the size of the entrance and exit apertures as well as the launch angle into the light pipe 70. Further anamorphic optics focus the source beam into the line beam of desired dimensions on the surface of the wafer 22.

One problem in laser radiation thermal processing is maintaining the integrity of the optics and rapidly detecting its deterioration thus preventing imminent failure of the laser source. To a large extent, the integrity of the optics depends on of the condition of the interfaces at which the optics components are joined together. Typically, the optics components are attached to each other at their interfaces with adhesives. If one of the components or the adhesive degrades, significant amounts of radiation power is scattered within the housing encapsulating the optics instead of propagating through the optics toward the substrate. It is desired to restrict the damage to the one section of components in which the failure is occurring. For example, the lenslets are epoxied to the laser bar stacks and may delaminate from the stacks causing the laser light to scatter within the chamber. It is desired to restrict the damage to the lenslets and not allow the scattered radiation to heat up and degrade the other components, for example, the PMUX and interleaver and interfaces attached to them. Conventionally, a thermocouple is used to measure an increase in the ambient temperature within the housing or the temperature of optical assemblies resulting from the increase of laser radiation. However, the response time of a thermocouple is often too slow to report a rapid catastrophic system failure, and the system may collapse before an appreciable rise in the housing temperature occurs. A rapid indication of the level of radiation energy within the housing is therefore desired to detect a component failure and prevent the catastrophic deterioration of the system. One aspect of this invention uses photodiodes to detect the failure in the system components and enable a timely shutdown of the system.

Figure 6:
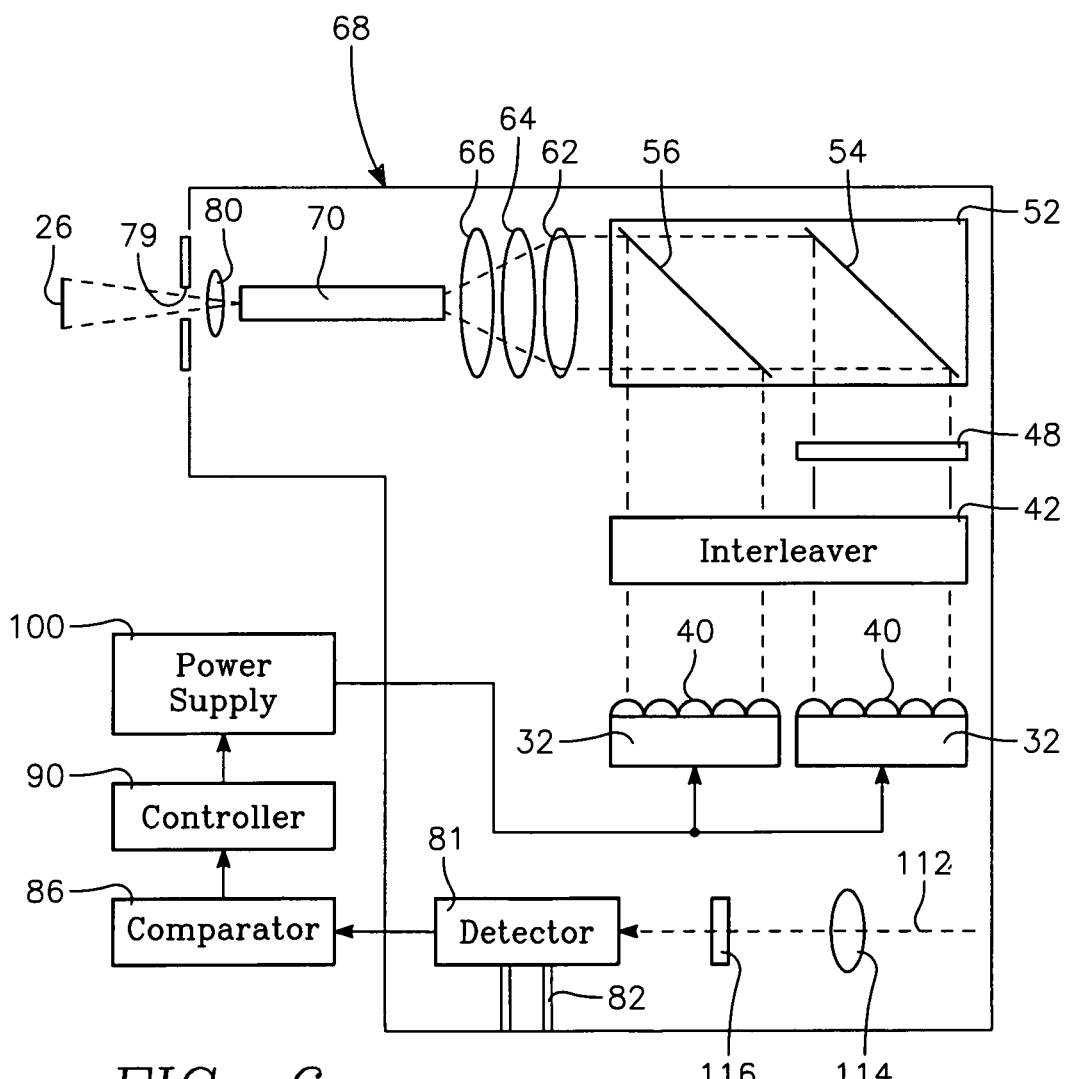
FIG. 6 is a schematic diagram of an optical system in accordance with an embodiment of the invention.

Referring to FIGS. 3 and 6, the optics, including the interleaver 42, the quarter-wave plate 48, and the PMUX 52 and its interfaces 54, 56, are joined together and encapsulated inside a lightproof housing 68 of the beam source 20 of FIG. 1 having an output aperture 79 facing the substrate 22. Similarly, the lenslets 40 are bonded to the laser bars stacks 32 with an adhesive. A light detector or photo diode 81 and a controller 90 are used to effectuate a fast intervention into operation of the laser thermal processing system by interrupting power from a power supply 100 to the laser bar stacks 32 upon deterioration of one or more optical components in the housing 68 to prevent a catastrophic failure of the thermal processing system.

The light detector 81 is preferably located inside the housing 68 adjacent to the laser stacks 32, the interleaver 42, or the PMUX 52 and can be supported by a support structure 82, such as a support ring attached to the housing 68. The light detector 81 should be out of the direct path of the laser light assuming the optical components have not degraded. It should also be out of the path of waste light, for example waste beams 110 from the interleaver 42 that are imperfectly reflected and interleaved or the residual light 111 that is transmitted through wavelength or polarization selective reflectors, such as the interfaces 54, 56 in the PMUX 52. The photodetector 81 should also be out of the direct path of the laser light reflected from the wafer 22, perhaps at angles that are not specular because of the wafer surface structure. The photo detector 81 should also not point to the radiation dumps used to suppress the waste radiation. Instead, the light detector 81 should be pointing in a direction that is nominally dark. For example, the photo detector 81 may be located in back of the laser stacks 32 and be pointed along an optical axis 112 directed to a portion of the housing 68 at the lateral side of the laser stack 32 that normally does not receive radiation from the laser bars. When one of the optical components begins to fail or its adhesive or encapsulant loosens, the tightly controlled optical focusing is lost, and laser radiation from the bar stacks 32 begins to propagate along unintended paths and strike unintended reflective structures within the housing 68. That is, imminent failure is marked by an increase of ambient radiation within the housing 68 at the laser wavelength.

Optionally, the support structure 82 for the photo detector 81 may be a translation mechanism to move the light detector 81 vertically in order to sense light radiation level in various areas across the housing 68.

The translation mechanism 82 can be fixedly attached to the frame of the housing 68 and can be capable of extending and detracting along a path across the housing 68 to obtain the most optically advantageous position for the light detector 81. The translation mechanism 82 can include a horizontal actuator that can move the light detector laterally in order to adjust the distance between the light detector 81 and optics in the housing 68. Optionally, a rotary actuator can be connected to the housing 68 in order to rotate the light detector 81 around the optics in the housing.

Figure 4:
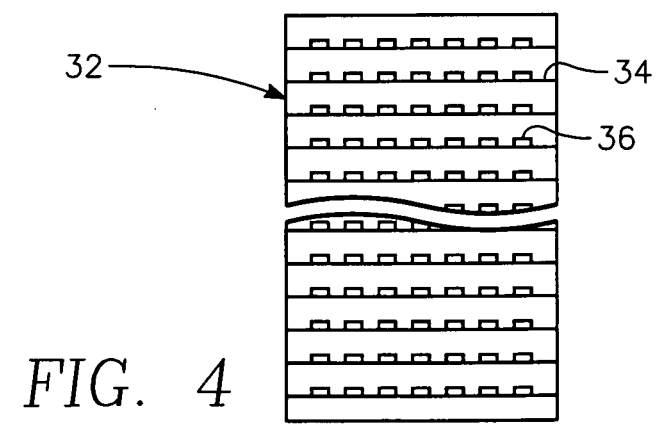
FIG. 4 is an end plan view of a portion of a semiconductor laser array in the apparatus of FIG. 1.

Referring to FIGS. 3, 4, and 6, the light detector 81 may be a photo diode to measure the light radiated within the housing 68 received within some field of view about the optical axis 112. A lens 114 may be used to control the field of view. An optical filter 116 may be disposed in front of the input to the light detector 81 to preferentially pass the laser wavelength and suppress thermal radiation at longer wavelengths. A comparator 86 receives the electrical output of the photo detector (such as, for example, the photocurrent from the photodiode) to compare the measurements taken by the photo detector 81 with the base amount of the scattered light radiated into the housing 68 under the normal system operation. The light detector 81 is preferably sensitive to the wavelength of the laser radiation, for example, 810 nm for GaAs laser bars. A silicon photodiode or pin detector provides the required sensitivity. A possible position for the light detector 81 is in back of the laser stacks 32 with a field of view pointing to the lateral side or away from the laser stacks 32.

The photo diode preferably is a silicon photodiode made of "n" type silicon material. The basic elements of photo diode 81 include a "p" layer formed on the front surface of the device. The interface between the "p" layer and the "n" silicon is known as a pn junction. Alternatively, the photodiode 81 is formed of a "n" layer on a "p" substrate. Other types of silicon photodetectors are known, such as pin photodiodes and charged coupled devices and photodetectors of other materials are available. Metal contacts are connected to the anode and cathode of the photo diode is the anode. Unillustrated biasing circuitry provides the requisite biasing voltage to the photodiode and amplifies and separates the photocurrent to the comparator 86.

The photodetector 81 may be disposed inside the housing 68 or alternatively disposed outside of it with either an optically transparent window or with an optical fiber receiving radiation inside the housing 68 and conveying it to the photodetector located outside. Either zero or reverse bias photodiodes 74 can be used, although the reverse biased photodiodes are more preferable for the rapid detection of the increased laser radiation in the housing 68 because their circuits are more sensitive to light.

High voltage is preferably applied to the diode contacts of the reverse biased diode to increase the sensitivity of the diode to the radiation. The voltage is applied across the high resistance of the reversed biased semiconductor junction. The high resistance is reduced when light of an appropriate frequency impinges on the diode. For a fast response time required in the system 30, the resistance and operating voltage of the photo diode 81 must be chosen corresponding to the operating wavelengths between 810 nm and 1550 nm. Alternatively stated, the detected photons generate electron-hole pairs in the vicinity of the pn junction, which is detected in the sensing circuit as a photocurrent.

Referring to FIG. 6, the comparator 86 is an interface device that receives, processes and analyzes signals from the photo diode 81. The comparator 86 may include analog processing circuitry (not shown) for normalization or amplification of the signals from the photo diode 81 and an analog to digital converter (not shown) for conversion analog signals to digital signals. The comparator 86 continuously monitors and takes measurements of actual current signals from the photo diode 81 and compares the processed signals from the photo diode 81 with a predetermined value corresponding to a baseline amount of scattered light in the housing during normal operation of the optical system 30. If the value of the signal from the photo diode 81 does not exceed the threshold of the predetermined baseline value, the comparator does not act. Whenever or if the voltage level exceeds a predetermined reference level, the comparator 86 will generate a signal to the controller 90 indicating the presence of a meaningful increase in radiating power scattered within the housing 68. The comparator may also include electronic filtering to remove noise from the photocurrent so that imminent failure is flagged only when the photocurrent exceeds a threshold for a predetermined length of time. Upon receipt of this detection signal, the controller 90 sends a control signal to the power supply 100 to cease delivering power for the emission of the radiation beam from the beam source 20. The comparator 86 can be located inside of the housing 68 apart from the photo diode 81, or it can be coupled and moved with the photo diode 81 by the translation mechanism 82 or yet further alternatively may be stationary and linked to the moving beam source 20 by flexible wiring. Alternatively, the comparator 86 may be included in the controller 90 positioned outside the housing 68.

The operations of the system of FIG. 1 can be coordinated by the controller 90. Controller 90 may be a general purpose programmable digital computer connected to the comparator 86, the power supply 100, and, optionally, to the translation mechanism 82 supporting the photodetector 81 as well as the translation mechanisms of the gantry structure 10. The controller 90 can be programmed to stationarily position the photo diode 81 for the best exposure of the optically transparent window, to activate or interrupt the power supply 100, to determine the level of the light radiation in the housing 68 and to activate visual and sound emergency alarms, and, optionally, move the photo diode 81 within the housing 68.

In operation, the power supply 100 provides electric power to energize the beam source 20, which includes laser light source and optical system 30, for emission of a downwardly directed beam 24 for thermal processing of the substrate. The light scattered in the housing 68 from the optical system 30 under the normal operational conditions of the system 30 can be sensed by the photo diode 81. The photo diode 81, which is sensitive to the normal operational light energy emitted in the housing 68 by the interleaver 42 and the PMUX 52, can generate a continuous current response signal to the comparator 86 proportional to the intensity of the amount of the scattered light received. When one or more of the optical components of the system 30, including the reflective and anti-reflective coatings, or adhesives which seal the interfaces of the interleaver 42 and the PMUX 52 or the cylindrical lens 62, 64, 66, begin to fail, the light radiated through the ruptured component escapes from the optical system 30 into the housing 68. A large increase in radiated power scattered within the housing 68 is immediately detected by the photo diode 81 and a current signal proportional to the increased radiation is sent to the comparator 86. The controller 90 receives from the comparator 86 a signal associated with the condition that exceeds a predetermined baseline value corresponding to the radiation in the housing 68 under the normal operations. This indicates the presence of the deterioration of the optical system 30, and the controller 90 immediately disengages the power supply 100 based on the data from the comparator 86 to stop further emission of the light radiation from the beam source 20.

Although the invention has been described with respect to scanning of a linear laser beam, the invention may be applied to other thermal processing system involving high intensity radiation, for example, a pixel pulsed laser system or a blanket irradiation system.

The system for optical control of thermal processing of a substrate has several advantages. The system provides a measurement technique of the level of light radiation that is suitable for the high temperature and high radiation level environment of a laser thermal processing system. Furthermore, the light detector 81 can move within the housing 68 and consequently the light detector 81 can be capable of obtaining the most advantageous position for the photo diode window or optical fiber connection 92 to sense an excessive light radiation. The system can be simple, robust and inexpensive and does not require change to the layout of the laser thermal processing system. Most importantly, the system enables a much more rapid response than any existing measuring technique for the detection and prevention of catastrophic failure that would occur in the absence of rapid intervention.

It may be possible to carry out the invention without either the interleaver 42 or the polarization multiplexer 52 or without both of them. While the invention has been described in detail by specific reference to preferred embodiments, it is understood that variations and modifications thereof may be made without departing from the true spirit and scope of the invention.

What is claimed is:

1. A system for thermal processing of a workpiece, comprising:
   a source of electromagnetic radiation for thermal processing of the workpiece;
   optics comprising an assembly of plural optical components;

a housing comprising plural walls enveloping said optics, said plural optical components corresponding to respective optical paths within said housing;

a void inside the housing disposed away from said respective optical paths;

a detector arranged to detect an electromagnetic radiation level in said void and send an output signal;

a power supply to provide power to the source of electromagnetic radiation; and a controller to control the power supply based on the output signal from the detector.

2. The system of claim 1 further comprising a sealant joining together at least one of said optical components with one of: (a) said housing, (b) said source, (c) another one of said optical components, wherein the sealant is a UV curing epoxy.

3. A system for thermal processing of a workpiece, comprising:

a source of electromagnetic radiation for thermal processing of the workpiece;

optics disposed between the source and the workpiece, said optics comprising an assembly of plural optical components, said optics providing an optical path between said source and said workpiece;

a housing comprising plural walls enveloping said optics, and a void inside the housing away from said optical path, said void receiving no direct radiation from said source and being illuminated upon deterioration of said optics;

a detector arranged to detect an electromagnetic radiation level in said void in the housing and a comparator responsive to said detector for producing a deterioration signal;

a power supply coupled to the source of radiation; and a controller to control the power supply based on the deterioration signal from the comparator.

4. The system of claim 3 wherein said comparator is configured to produce the deterioration signal whenever an output of said detector exceeds a predetermined threshold level.

5. The system of claim 3 wherein said detector is positioned to detect an ambient level of light electromagnetic radiation inside said housing.

6. The system of claim 3 wherein said optics comprises an assembly of plural optical components, and a sealant joining together at least one of said optical components with one of: (a) said housing, (b) said source, (c) another one of said optical components, wherein the sealant is a UV curing epoxy; wherein said deterioration comprises deterioration of said sealant.

7. An apparatus for thermal processing of a workpiece, comprising:

a source of electromagnetic radiation;

an optical system disposed between the source and the workpiece;

a housing comprising plural walls enveloping the optical system therein;

an electromagnetic radiation detector disposed to sense a radiation level within a zone of said housing that is outside of optical paths of said optical system, and a comparator coupled to said electromagnetic radiation detector and configured to produce a deterioration signal upon an output of said electromagnetic radiation detector exceeding a predetermined reference level;

a power supply coupled to the source of electromagnetic radiation; and a controller configured to interrupt power from the power supply in response to the deterioration signal.

8. The apparatus of claim 7 wherein said comparator is located outside of said housing.

9. The apparatus of claim 7 further comprising a sealant attaching said optical system to said housing.

10. The apparatus of claim 1 wherein said source is inside said housing whereby said walls envelope said source and said optics.

11. The apparatus of claim 3 wherein said source is inside said housing whereby said walls envelope said source and said optics.

12. The apparatus of claim 7 wherein said source is inside said housing whereby said walls envelope said source and said optical system.

13. The apparatus of claim 1 wherein said detector is located inside said housing.

14. The apparatus of claim 13 wherein said detector is located inside said void.

15. The apparatus of claim 3 wherein said detector is located inside said housing.

16. The apparatus of claim 15 wherein said detector is located inside said void.

17. The apparatus of claim 7 wherein said zone receives no direct electromagnetic radiation from said source and is illuminated only upon deterioration of said optical system.

* * * * *